J. H. LUBBERS.
GLASS DRAWING APPARATUS.
APPLICATION FILED MAR. 17, 1906.

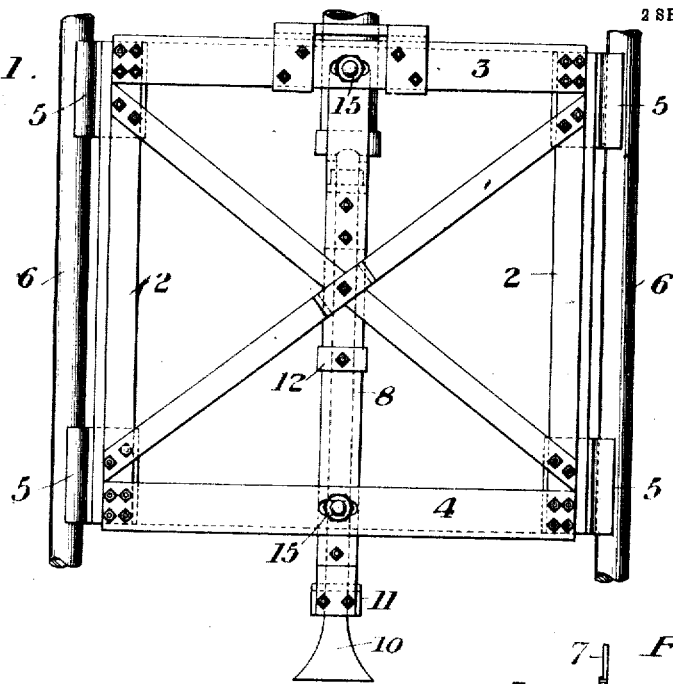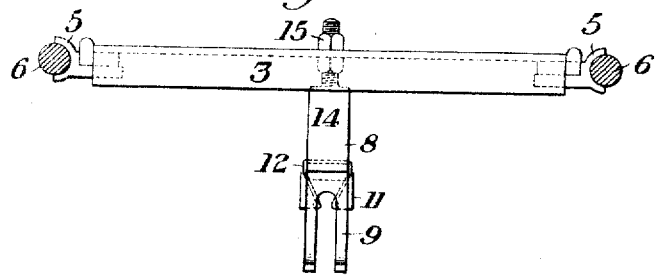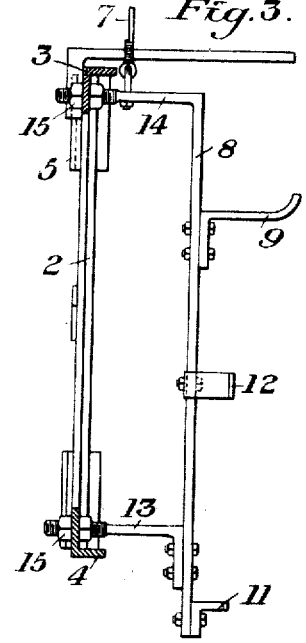

914,588.

Patented Mar. 9, 1909.
2 SHEETS—SHEET 2.

WITNESSES
R. A. Balderson
Warren W. Swartz

INVENTOR
John H. Lubbers
by Bakewell Byrnes
his attys

UNITED STATES PATENT OFFICE.

JOHN H. LUBBERS, OF ALLEGHENY, PENNSYLVANIA, ASSIGNOR TO WINDOW GLASS MACHINE COMPANY, OF PITTSBURG, PENNSYLVANIA, A CORPORATION OF NEW JERSEY.

GLASS-DRAWING APPARATUS.

No. 914,588.  Specification of Letters Patent.  Patented March 9, 1909.

Application filed March 17, 1906. Serial No. 306,522.

*To all whom it may concern:*

Be it known that I, JOHN H. LUBBERS, of Allegheny, Allegheny county, Pennsylvania, have invented a new and useful Glass-Drawing Apparatus, of which the following is a full, clear, and exact description, reference being had to the accompanying drawings, forming part of this specification, in which—

Figure 4:
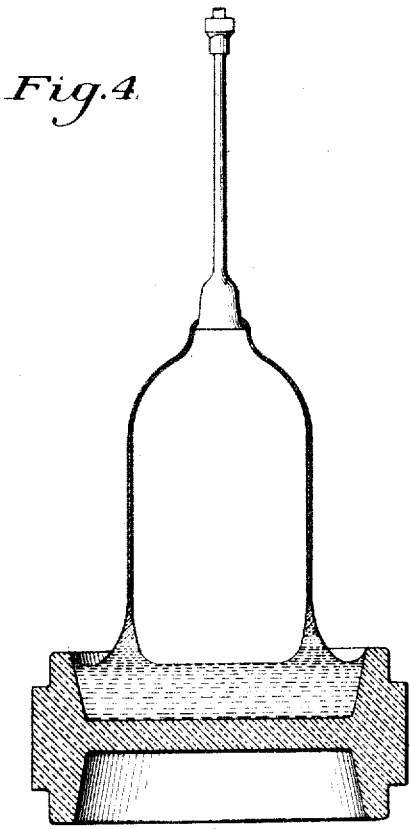
Figure 5:
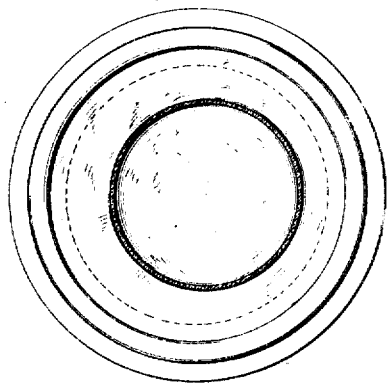
Figure 6:
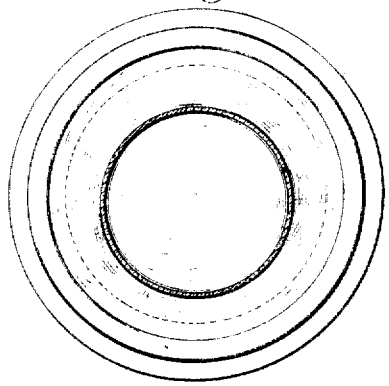

Figure 1 is a front elevation of a drawing frame constructed in accordance with my invention; Fig. 2 is a top plan view of the same; Fig. 3 is a vertical cross-section; Fig. 4 is a diagrammatic view showing the forming of the glass into the cylinder during the draw; and Figs. 5 and 6 are cross sections of the cylinder looking downwardly showing different adjustments between the drawing frame and the glass receptacle.

My invention relates to glass drawing mechanism wherein the article, whether hollow or otherwise, is drawn upwardly from a bath of molten glass. In such drawing operations, it has been found difficult to make the glass of the same thickness in the different portions of the circumference of the hollow article, or different parts of the plate, if a plate or sheet is being drawn. The glass thus drawn is often of the "thick and thin" variety. This forming of thick and thin portions during the drawing operation is not only objectionable on account of the variation in thickness; but it causes a large amount of breakage both during the drawing and the subsequent treatment. It also injures the quality of the glass by making it very difficult to flatten properly, where cylinders are formed, produces waste in cutting, and sometimes prevents cutting the glass in the desired way.

I have found that where the glass is fed into a receptacle, for example, a refractory pot, the glass may be of a different temperature and stiffness in one portion of the pot from that in another portion; and the heat of the pot may vary in different parts thereof. There may also be variations in the character of the pot material in different portions of its walls, and other causes also lead to a difference in the surface tension in different parts of the article being drawn. I have found that by adjusting the pot and drawing mechanism relatively to each other, I can reduce and avoid these difficulties to a large extent. With proper care in the adjusting, I can practically eliminate thick and thin glass and its consequent difficulties and objections. The importance of this will be understood when it is considered that in changing shifts of men all of the conditions surrounding the feeding of glass into the pot and the drawing operations are changed. These operations still depend to a considerable extent on the skill and familiarity of the workmen. For example, if the glass is ladled from the tank into the drawing pots, one operator may become accustomed to ladling the glass from a portion of the bath which is at a certain distance from the wall of the tank. His successor on the next shift may be accustomed to ladling from a different point in a different manner and under other conditions. For these reasons, it has been found that where the drawing was proceeding in the proper manner with one ladler, it might draw in an entirely different manner with the next ladler. For some time it was not understood what caused this difference which led to such important variations in the drawing of the glass. I have found that by adjusting the pot and drawing tool or bait relatively to each other in a lateral direction, I can to a large degree compensate for these differences owing to individual peculiarities in the workmen, and with proper care can practically eliminate thick and thin glass. Similarly, I can overcome the troubles arising from variations in the heat conditions and material of the pot.

In the drawing, referring to Figs. 1, 2 and 3, I show a drawing cage consisting of a rectangular frame having side bars 2, 2 and top and bottom rails 3 and 4. The frame is provided with guides 5 moving over the vertical guide-bars 6, and the frame may be raised through any suitable connections such as the cable 7. At the center of the frame is a vertical bar or support 8, from which projects forwardly the hook 9, on which the blow-pipe 10 is hung. This hook 9 is forked to receive the projections on the blow-pipe, which at its lower end rests within the slot in the guide 11.

12 is an intermediate spring which bears against the intermediate part of the blow-pipe.

The vertical central bar 8 is supported by two arms 13 and 14, of which the upper may consist of a rearwardly bent extension of the bar itself as shown. These arms are provided with screw-threaded stems which extend through horizontally slotted holes in the drawing frame and are held by the adjusting nuts 15. It is evident that by loosening the adjusting nuts the blow-pipe carrier may be moved across the frame; and by shifting the position of the adjusting nuts the blow-pipe may be moved toward or from the plane of the cage. I thus obtain two horizontal adjustments at right angles to each other by which I can bring the blow-pipe or bait to any desired position relative to the walls of the pot. If on starting a shift it is found that the glass is drawing thick and thin upon a pot, I loosen the adjusting screws for the blow-pipe support of this pot and shift the position of the blow-pipe to compensate for the differing conditions of tension at the different parts of the surface of the bath. For example, if the glass is of a lower temperature at one side of the bath than at the opposite side, the blow-pipe will be moved toward the hotter side. The cooler and stiffer portion of the glass will have a greater surface tension than the hotter portion, and consequently by moving the blow-pipe toward the hotter portion I can compensate for this difference in the condition. Similarly, if the cavity or wall of the pot is hotter on one side than the other, thus giving more heat to the glass, I move the bait correspondingly. It is found in practice that by adjusting the position of the bait or blow-pipe relative to the walls of the pot, the difficulties in drawing thick and thin glass are practically overcome. In practice this adjustment may be needed when a shift is changed or it may be needed even while the same workmen are operating the apparatus. The occasion which calls for adjustment is easily recognized, and with a little practice the mode of adjusting is easily understood.

The advantages of my invention will be apparent. It being practically impossible to make the conditions the same in the glass bath throughout all parts thereof I am enabled by my invention to counteract and compensate for the differences. I thereby not only improve the quality of the glass by obtaining substantially uniform thickness, but I greatly increase the output, reduce the cost of subsequent operations, and also the amount of breakage.

It will be understood that the relative adjustment between the bait and the pot may be obtained either by adjusting the pot laterally in different portions, or by adjusting the bait carrier. The adjustments may be carried out in many different ways without departing from my invention, since I consider myself the first to provide adjusting means for shifting the relative position of the bait and receptacle.

I claim:—

1. In glass drawing apparatus, a glass-holding receptacle, and a bait or drawing device, one of said parts being adjustable relative to the other in a lateral direction; substantially as described.

2. In glass drawing apparatus, a glass holding receptacle, and a drawing device, the drawing device being adjustable laterally relative to the pot; substantially as described.

3. In glass drawing apparatus, a glass-holding receptacle, a bait, a bait support, and mechanism for adjusting said support laterally in different directions; substantially as described.

4. In glass drawing apparatus, a glass-holding pot, a bait, and a bait support, said support being adjustably mounted to provide for adjustments in different lateral directions relative to the receptacle; substantially as described.

5. The method of drawing glass of substantially uniform thickness, consisting in adjusting the point of draw relative to the wall of the pot to compensate for varying conditions in the glass of the bath; substantially as described.

6. The method of drawing hollow glass articles of substantially uniform wall thickness, consisting in adjusting the piston of the bait laterally relative to the walls of the pot to compensate for varying conditions in the glass bath, and then drawing the hollow glass article from said bath; substantially as described.

7. The method of drawing glass of substantially uniform thickness from a molten glass bath, consisting in adjusting the point of draw to provide for substantially uniform surface tension in the different parts of the article being drawn; substantially as described.

In testimony whereof, I have hereunto set my hand.

JOHN H. LUBBERS.

Witnesses:
JOHN MILLER,
H. M. CORWIN.